United States Patent [19]
Kotzin et al.

[11] Patent Number: 5,819,181
[45] Date of Patent: Oct. 6, 1998

[54] APPARATUS AND METHOD FOR MITIGATING EXCESS TIME DELAY IN A WIRELESS COMMUNICATION SYSTEM

[75] Inventors: Michael D. Kotzin; Dennis R. Schaeffer, both of Buffalo Grove; John S. Csapo, Glenview; Dennis J. Thompson, Geneva; Stephen L. Spear, Skokie, all of Ill.

[73] Assignee: Motorola, Inc., Schaumburg, Ill.

[21] Appl. No.: 609,076

[22] Filed: Feb. 29, 1996

[51] Int. Cl.⁶ .............................. H04B 7/01; H04B 7/20
[52] U.S. Cl. ........................... 455/503; 455/436; 370/350
[58] Field of Search .................................. 455/33.1, 33.2, 455/33.4, 51.1, 51.2, 53.1, 54.1, 56.1, 67.1, 67.6, 436, 503; 370/331, 334, 350; 379/60

[56] References Cited

U.S. PATENT DOCUMENTS

| | | | |
|---|---|---|---|
| 4,696,052 | 9/1987 | Breeden | 455/33.4 |
| 5,038,403 | 8/1991 | Leitch | 455/51.2 |
| 5,280,472 | 1/1994 | Gilhousen et al. | |
| 5,457,810 | 10/1995 | Ivanov et al. | 455/33.2 |
| 5,530,915 | 6/1996 | Shaughnessy et al. | 455/51.2 |

*Primary Examiner*—Nguyen Vo
*Assistant Examiner*—Sam Bhattacharya
*Attorney, Agent, or Firm*—John B. MacIntyre; Richard A. Sonnentag

[57] ABSTRACT

A wireless communication system (200, 300, 400, 500) mitigates the effects of excess timing delay caused by varying lengths of communication paths. In one general implementation, a transition communication path (206, 323, 329) is used to transfer a time-advanced version of a timing reference signal so that the cumulative time delay at a transition cell (209, 325, 331) is reduced. In another general implementation, the timing reference signal is time-advanced in all communication paths (403–411), and selected communication paths (403–407) include a time delay means (423–427, 503–507) such that the cumulative time delay at an area (421) near a target coverage area (130) is reduced. By reducing the cumulative time delay at the area (421) near the target coverage area (130), a handoff of a communication of a mobile station (128) into the target coverage area (130) can be performed.

22 Claims, 6 Drawing Sheets

APPARATUS AND METHOD FOR MITIGATING EXCESS TIME DELAY IN A WIRELESS COMMUNICATION SYSTEM

FIELD OF THE INVENTION

The present invention relates generally to wireless communication systems and, more particularly, to mitigating excess time delay in such wireless communication systems.

BACKGROUND OF THE INVENTION

The operation of wireless communication systems is well known in the art. Generally stated, a base-station is utilized to convey an information signal from a source (for example a user within a public switched telephone network, or PSTN) and a user of the wireless communication system. The user of the wireless communication system is commonly referred to as a mobile station. In typical wireless communication systems, the mobile station moves within a coverage area serviced by the base-station. When the mobile station moves from one coverage area serviced by a base-station to another coverage area serviced by a different base-station, the mobile station's communication with the first base-station is "handed off" to the second base-station so that the communication is maintained. Handoff of the mobile station from one coverage area to another in this macrocell environment is well known in the art.

Figure 1:
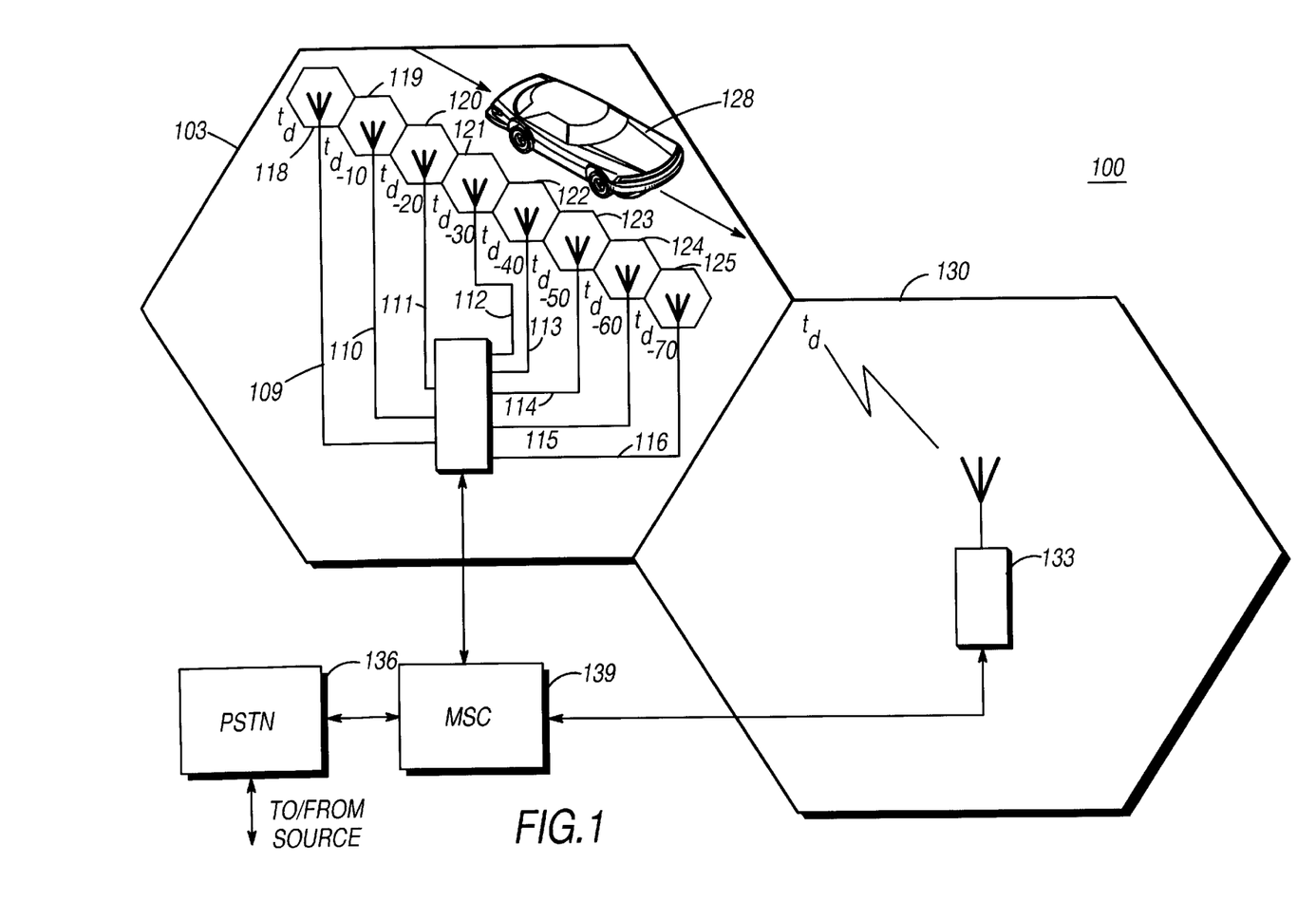
FIG. 1 generally depicts a prior art wireless communication system which experiences the problems of excess time delay.

A base-station can likewise be used to service mobile stations in smaller, lower power cells called microcells. Such a wireless communication system having a microcell implementation is also well known in the art, and is generally depicted in FIG. 1. As shown in FIG. 1, a first coverage area 103 is serviced by a base-station 106. In this embodiment, the communication paths 109–116 are configured to service microcells 118–125. As a mobile station 128 moves from the microcell 118 to the microcell 125, the time delay $t_d$ incurred by the mobile station 128 increases due to the variation in length of the communication paths 109–116. For the time delay $t_d$ to increase as shown in FIG. 1, each communication path, starting from communication path 109, must progressively get longer.

As the mobile station 128 moves from the first coverage area 103 towards a second coverage area 130, the total (cumulative) time delay $t_d$ from the last microcell 125 (communication path 116) to the base-station 133 servicing coverage area 130 can be seen to be 70 microseconds. In a typical scenario, the communication from the base-station 106 to the mobile 128 would be handed off to the base-station 133 (as is well known in the art) when the mobile station moves from the microcell 125 (within the first coverage area 103) to the second coverage area 130.

Certain wireless communication systems specify a maximum timing differential (as seen by the mobile station 128) between source/target coverage areas when handoff is to occur. For example, Interim Standard-95 (IS-95), which governs the functional/operational requirements of a CDMA wireless communication system if implemented in the United States, specifies a maximum allowable timing differential (between source/target coverage areas) of 60 microseconds. For more information on IS-95, see TIA/EIA/IS-95, *Mobile Station-Base Station Compatibility Standard for Dual Mode Wideband Spread Spectrum Cellular System*, July 1993. When the timing differential exceeds the 60 microseconds limit (as in FIG. 1), the mobile station 128 is unable to lock to the "target" base-station 133 to perform a handoff. As such, because of this excess time delay, the communication to the mobile station 128 cannot be maintained during handoff. Stated differently, when the timing delay exceeds that allowed by the wireless communication system specification, the mobile station 128 has limited capability to maintain the communication during handoff. This in turn results in a high likelihood that the mobile station's communication will be terminated.

Thus a need exists for an apparatus and method for mitigating the effects of excess time delay in a wireless communication system so that a communication to a mobile station may be maintained in the presence of the excess time delay.

DETAILED DESCRIPTION OF A PREFERRED EMBODIMENT

A wireless communication system mitigates the effects of excess time delay due to varying lengths of communication paths. In one general implementation, a transition communication path is used to transfer a time-advanced version of a timing reference signal so that the cumulative time delay at a transition cell is reduced. In another general implementation, the timing reference signal is time-advanced in all communication paths, and selected communication paths include a time delay means such that the cumulative time delay at an area near a target coverage area is reduced. By reducing the cumulative time delay at the area near the target coverage area, a handoff of a communication of a mobile station into the target coverage area can be performed.

To mitigate the effects of the time delay in accordance with the invention, the wireless communication system implements a first base-station, located in a first coverage area, for maintaining a communication to the mobile station via a plurality of communication paths. The first base-station utilizes a timing reference signal such that the communication of the source signal from one of a plurality of the communication paths experiences a time delay of the source signal with respect to a communication of the source signal from the remaining communication paths. The wireless communication system also implements a second base-station, located in a second coverage, for maintaining a communication to the mobile station. The second base-station also utilizes the timing reference signal. The wireless communication system also includes a means for adjusting the time delay of the source signal such that the time delay of the source signal is less than the excess time delay when the mobile station moves from the first coverage area to the second area. In this manner, a handoff of the mobile station from the first coverage area to the second area can be performed.

In a preferred embodiment, the means for adjusting comprises a transition base-station, located in the first coverage area, for maintaining the communication to the mobile station via a transition communication path. The transition base-station utilizes a time-advanced version of the timing reference signal to produce a time-advanced version of the source signal, and services a coverage area which is substantially near the second coverage area. In an alternate embodiment, the means for adjusting can also comprise a plurality of transition stations, each located in the first coverage area, each for maintaining a communication to the mobile station via a corresponding plurality of transition communication paths. In this embodiment, each of the plurality of transition stations utilize a different time-advanced version of the timing reference signal to produce different time-advanced versions of the source signal.

In still another embodiment, the means for adjusting comprises a timing advance means for producing a time-advanced version of the timing reference and a delay means, in selected communication paths, for delaying the time-advanced version of the timing reference signal by corresponding selected amounts of time. By delaying the time-advanced version of the timing reference signal by corresponding selected amounts of time, the time delay of the source signal is less than the excess time delay when the mobile station moves from the first coverage area to the second area. In this embodiment, the timing advance means provides a predetermined amount of timing advance of the timing reference. Also in this embodiment, the delay means for each selected communication path can provide either a common amount of delay to each of the selected communication paths or a different amount of delay to each of the selected communication paths.

In the wireless communication system in accordance with the invention, the first and second coverage areas can either be a macrocell, a microcell coverage area, or a combination of the two. In the preferred embodiment, the plurality of communication paths are comprised of a plurality of fiber-optic links coupled to a distributed antenna arrangement. Likewise in the preferred embodiment, the wireless communication system comprises a code-division multiple access (CDMA) wireless communication system, but one of ordinary skill in the art will appreciate that the techniques described in accordance with the invention apply to any type of communication system which experiences the problematic effects of time delay disclosed herein.

Figure 2:
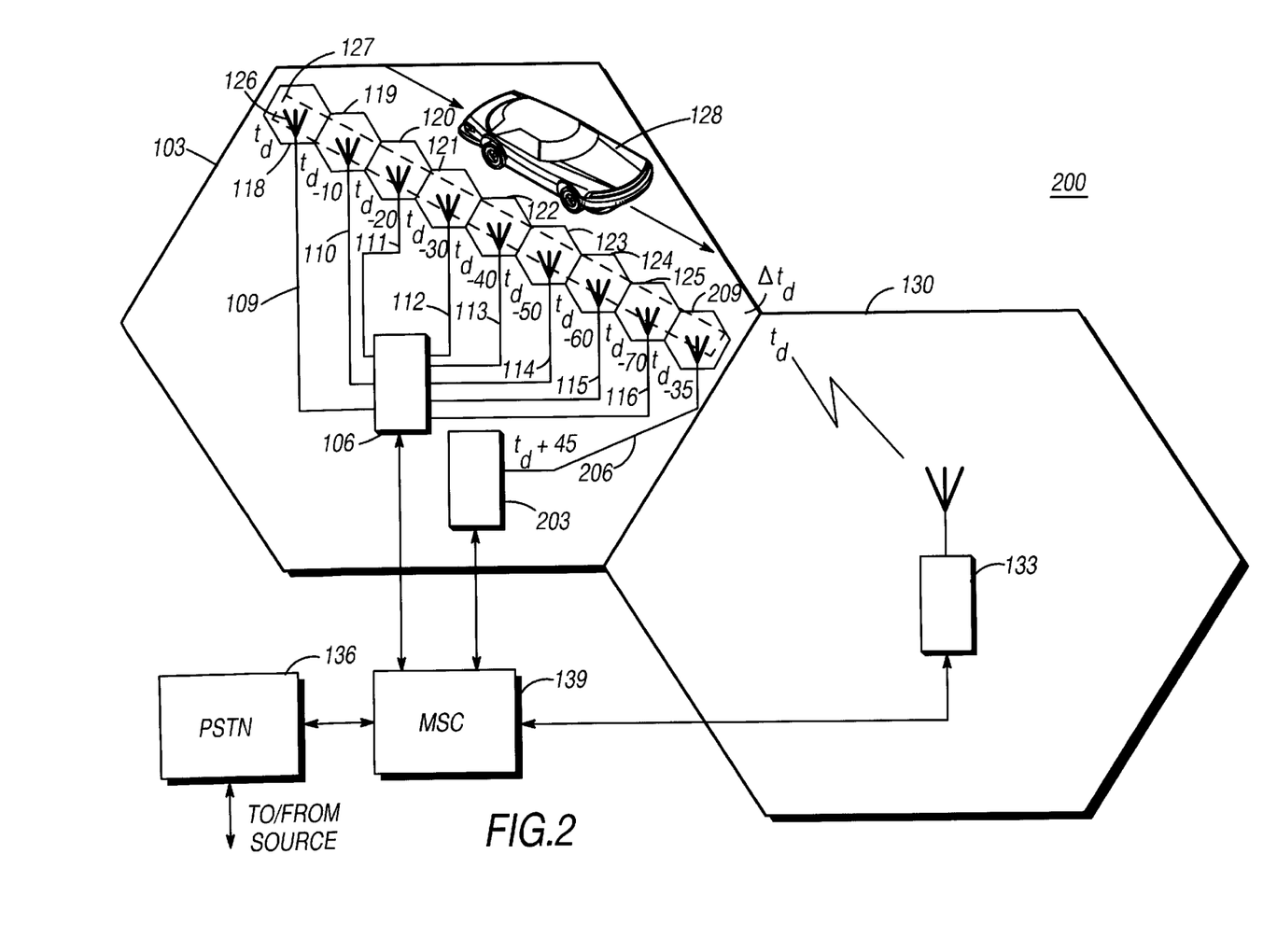
FIG. 2 generally depicts a preferred embodiment wireless communication system which mitigates excess time delay in accordance with the invention.

FIG. 2 generally depicts a preferred embodiment wireless communication system which mitigates excess time delay in accordance with the invention. In the preferred embodiment, the wireless communication system 200 of FIG. 2 is a code-division multiple access (CDMA) wireless communication system. As shown in FIG. 2 the CDMA wireless communication system 200 includes a public switched telephone network (PSTN) 136 coupled to a Mobile Switching Center (MSC) 139. Through the PSTN 136 and the MSC 139, a source signal is transferred to a base-station 106 which services a first coverage area 103. In the preferred embodiment, the base-station 106 provides service to a microcell coverage area defined by microcells 118–125, and the base-station is coupled to communication paths 109–116 to provide such service. While any number of types of links can be used, the communication paths 109–116 in the preferred embodiment are fiber-optic links coupled to a distributed antenna arrangement 127.

For the embodiment depicted in FIG. 2, the microcells 118–125 are aligned to provide wireless coverage in areas which are difficult to cover with conventional wireless configurations (for example, cellular coverage in a tunnel). By employing a single base-station 106 with a distributed antenna 127 as shown in FIG. 2, an easily-implemented, low cost solution for tunnel coverage is realized. The configuration, however, suffers from the timing delay problems as discussed above (with reference to FIG. 1).

The wireless communication system 200 includes all of the equipment depicted in FIG. 1, with the addition of a means for adjusting the time delay of a source signal in accordance with the invention. The means for adjusting the time delay compensates for the time delay such that the time delay is less than an excess time delay when a mobile station 128 transitions into a second (target) coverage area 130. In the preferred embodiment, the means for adjusting is a transition base-station 203, which is physically located in the first coverage area 103 (preferably near the base-station 106). The transition base-station 203 services a transition microcell 209 via a transition communication path 206.

Using the timing reference signal $t_d$, the transition base-station 203 servicing the transition microcell 209 has the capability to advance the timing by a certain predetermined amount. In the preferred embodiment depicted in FIG. 2, the predetermined amount of timing advance is 45 microseconds. The value of 45 microseconds is chosen for explanatory purposes only; the amount of timing advance required in an actual system implementation will be dependent upon the amount of time delay incurred by the actual communication paths 109–116 within the system.

Figure 6:
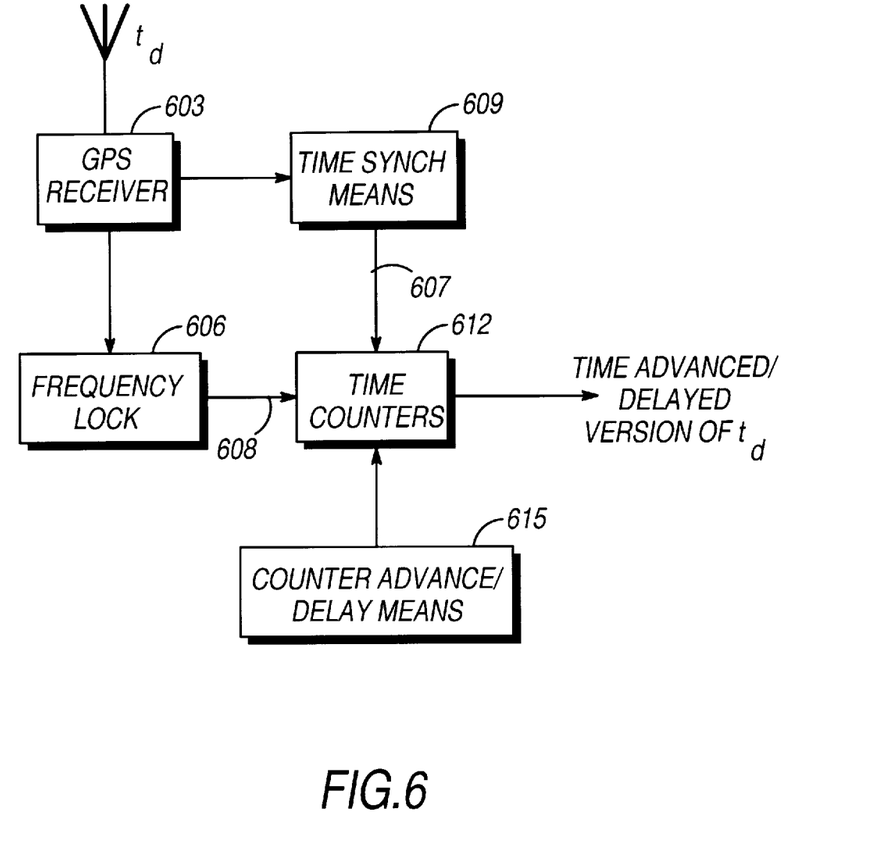
FIG. 6 generally depicts circuitry capable of implementing timing advance/delay at a base-station in accordance with the invention.

The methods used to create an advanced/delayed timing reference signal are well known in the art. One such approach is shown in FIG. 6, where adjustments to clock generation circuitry located at the base-station 203 is performed. As shown in FIG. 6, some external time and frequency reference, such as GPS (or LORAN), is used to produce a timing reference signal $t_d$. This is typically provided so that all cells in the system can be synchronized to transmit in time synchronism as prescribed in the IS-95 standard. A GPS receiver 603 receives timing reference signal $t_d$, which is then provided to a time synchronization means 609 and a frequency lock means 606. From this, a time synch signal 607 and a frequency lock signal 608 are provided to a time counters 612, which are set by the time synch signal 607 and clocked by the frequency lock signal 608. A counter advance/delay means 615 controls the amount of timing advance/delay, and provides the advance/delay information to the time counters 612. For example, if it were desired to create a reference timing signal time advanced by some Δt, the time counters 612 would be adjusted to be advanced by the amount Δt (as instructed by the counter advance/delay means 615), subsequent to their being time synchronized with the GPS external reference. The output of the adjusted time counters 612 provides the time advanced version of the timing reference signal $t_d$.

As can be seen in FIG. 2, without timing advance in accordance with the invention, the time differential ($\Delta t_d$) from the microcell coverage area 125 to the coverage area 130 is 70 microseconds, which is in excess of that allowed by IS-95. In this scenario, a handoff of the communication of the mobile station 128 from the coverage area 125 to the coverage area 130 can not be performed. When the time-advanced version of the timing reference signal $t_d$ is used in the transition microcell 209, the time delay from microcell 125 to transition microcell 209 will decrease by 35 microseconds. The time delay does not decrease by 45 microseconds because it is assumed that the transition communication path 206 is longer than the communication path 116 so that 10 microseconds of additional time delay are added by the transition communication path 206. Consequently, the net decrease in time delay is 35 microseconds. Since the time delay $t_d$ between the transition microcell 209 and the second coverage area 130 is now 35 microseconds, the mobile station 128 can lock to both base-stations 203 and 133 since the timing differential $\Delta t_d$ is within that allowed by IS-95 (60 microseconds). As such, a handoff of the mobile station 128 from the transition microcell 209 to the second coverage area 130 can occur without the dropped call problem incurred by the prior art wireless communication system 100 of FIG. 1. Use of the transition base-station as shown in FIG. 2 mitigates the excess time delay in the wireless communication system in accordance with the invention.

Figure 3:
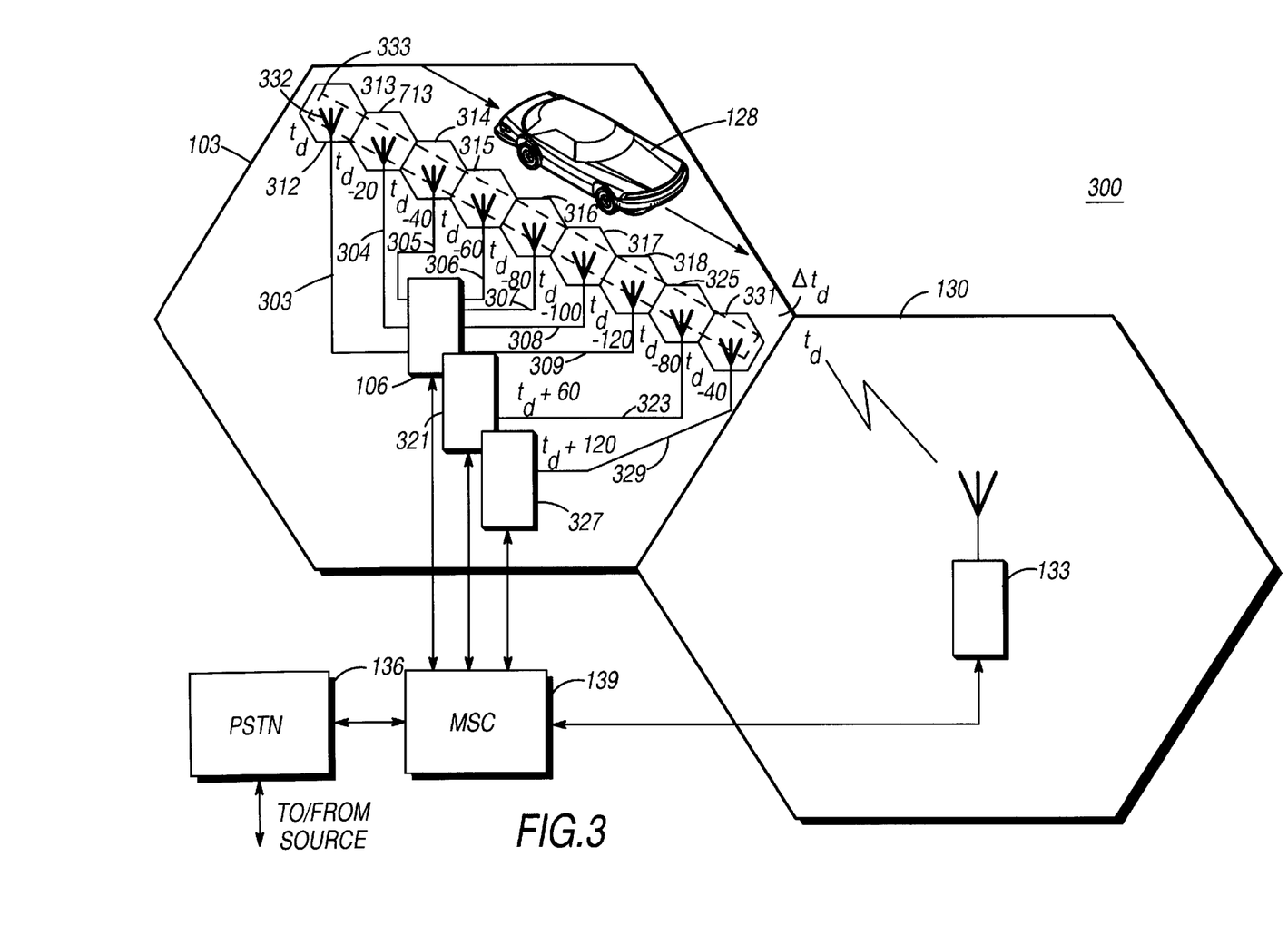
FIG. 3 generally depicts an alternate embodiment of the wireless communication system of FIG. 2 which also mitigates excess time delay in accordance with the invention.

FIG. 3 generally depicts an alternate embodiment of the wireless communication system of FIG. 2 which also mitigates excess time delay in accordance with the invention. As shown in FIG. 3, base-station 106 and 133 servicing the first and second coverage area (103 and 130 respectfully) as in FIG. 1 are depicted. However, the communication paths 303–309 servicing microcells 312–318 are different from the communication paths 109–116 of FIG. 1 in that the communication paths 303–309 of FIG. 3 introduce 20 microseconds of delay into the wireless communication system 300. As a consequence, the total time delay experienced by the mobile station 128 during its transition from the microcell 312 to the microcell 318 would be 120 microseconds. Since 60 microseconds is the maximum allowed time differential in IS-95, the time delay cannot be mitigated by a single transition base-station as in FIG. 2.

As such, FIG. 3 implements multiple transition base-stations 321 and 327 in accordance with the invention. As in FIG. 2, communication paths 303–309, 323 and 329 are fiber-optic links coupled to a distributed antenna arrangement 333. As is clear from FIG. 3, the communication path 323 has the timing reference signal $t_d$ advanced by 60 microseconds such that the time delay from microcell 318 to transition microcell 325 decreases by 40 microseconds (again assuming transition communication path 323 introduces 20 microseconds of time delay with respect to communication path 309). As noted, however, a 80 microsecond time delay is an excess time delay with respect to IS-95. To further mitigate the excess time delay, a second transition communication path 329 has the timing reference signal $t_d$ advanced by 120 microseconds, to produce a net decrease in time delay of 40 microseconds. Since 40 microseconds is less than the 60 microsecond time differential ($\Delta t_d$) allowed by IS-95, the mobile station 128 can lock to both base-stations 327 and 133, and a successful handoff can be completed from the transition microcell 331 to the second (target) coverage area 130 in accordance with the invention.

Figure 4:
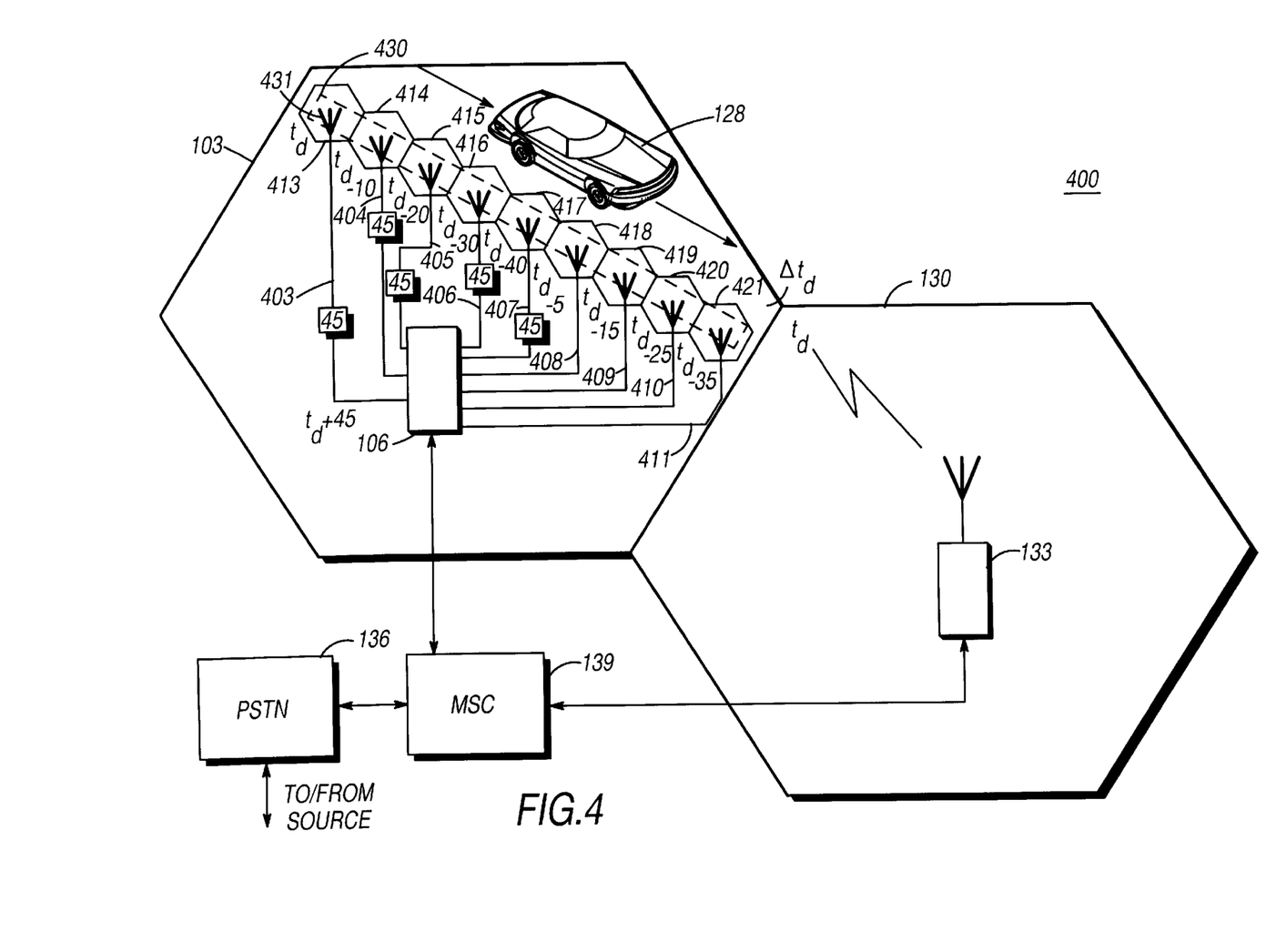
FIG. 4 generally depicts an alternate embodiment wireless communication system which mitigates excess time delay in accordance with the invention.

FIG. 4 generally depicts an alternate embodiment wireless communication system which mitigates excess time delay in accordance with the invention. As in FIG. 2, communication paths 403–411 are fiber-optic links coupled to a distributed antenna arrangement 430. As shown in FIG. 4, the wireless communication system 400 includes the base-stations 106 and 133 servicing coverage areas 103 and 130 (respectfully) as shown in FIG. 1, and the time delay increase from link-to-link is 10 microseconds. In this embodiment, the means for adjusting in FIG. 4 includes a timing advance means (located in the base-station 106) for producing a time-advanced version of the timing reference signal $t_d$. The timing advance means within the base-station 106 is functionally equivalent to the timing advance means described above with reference to FIG. 6.

The means for adjusting also includes a delay means 423–427, in selected communication links 403–407, for delaying the time-advanced version of the timing reference signal $t_d$. In this embodiment, the time delay produced in the selected communication links 403–407 are in corresponding selected amounts such that the time delay of a source signal (via the PSTN 136 and the MSC 139) is less than the excess time delay allowed by IS-95 for the mobile station 128. Again, for the sake of convenience, any time delay in excess of 60 microseconds limits the mobile station's capability of maintaining the communication when the mobile station is handed off from the first coverage area 103 to the second coverage area 130.

As depicted in FIG. 4, the timing advanced means within the base-station 106 provides a predetermined amount of timing advance of the timing reference signal $t_d$. In this embodiment, the predetermined amount of timing advance of the timing reference signal $t_d$ is 45 microseconds. As can also be seen in FIG. 4, communication paths 403–407 include delay means 423–427 which provide a common predetermined amount of 45 microseconds of delay to each of the selected paths 403–407. Since each of the communication paths 403–411 have the timing reference signal $t_d$ time-advanced by 45 microseconds, the communication paths 403–407 having the delay means 423–427 (respectively) therein will have a timing delay at the microcells 413–417 similar to the timing delays for the microcells 118–122 shown in FIG. 2. However, communication path 408 does not have a delay means therein, but does introduce 50 microseconds of delay as seen at the microcell 418. Consequently, the net time delay at microcell 418 (as seen by the mobile station 128) is 5 microseconds (50 microseconds of time delay plus 45 microseconds of time advance). A similar analysis holds true for the communication paths 409–411. As such, when the mobile station 128 moves from the final microcell 421 to the second coverage area 130, the difference in time delay ($\Delta t_d$) is 35 microseconds, well within the time differential allowed by IS-95. As such, the wireless communication system 400 depicted in FIG. 4 mitigates excess time delay in accordance with the invention.

Figure 5:
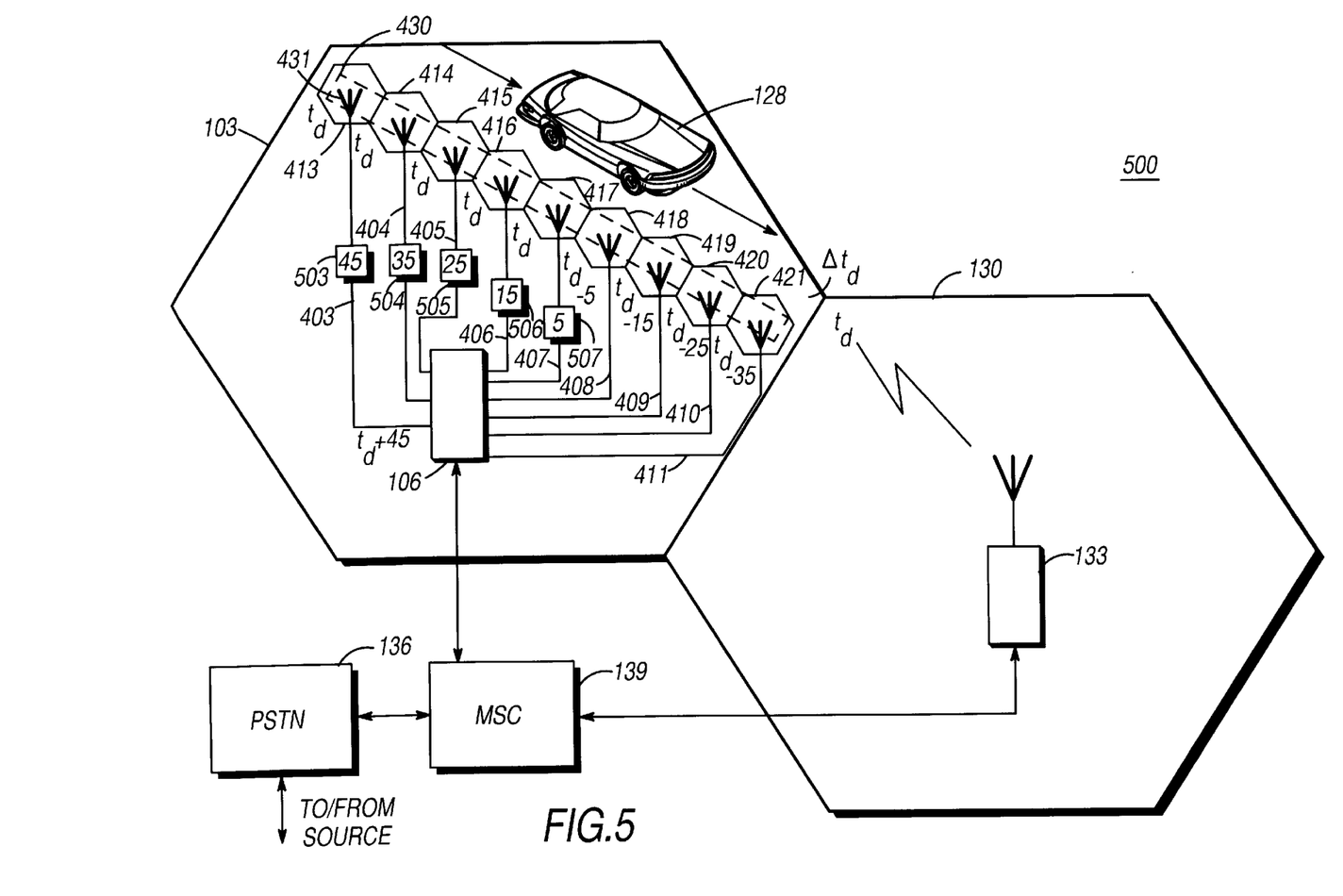
FIG. 5 generally depicts an alternate embodiment of the wireless communication system of FIG. 4 which mitigates excess time delay in accordance with the invention.

FIG. 5 generally depicts an alternate embodiment of the wireless communication system of FIG. 4 which mitigates excess time delay in accordance with the invention. As can be seen, the implementation of the wireless communication system 500 is similar to that of the wireless communication system 400 of FIG. 4, except that the delay means 503–507 for each selected communication path 403–407 provide a different amount of delay to each of the selected communication paths 403–407. The net result of this implementation is that the timing reference signal $t_d$ seen at the microcells 413–417 experiences no time delay. When the mobile station 128 arrives at the microcell 418 (and the subsequent microcells 419–421), the time delay increases as shown in FIG. 4. As in FIG. 4, when the mobile station 128 moves from the final microcell 421 to the second coverage area 130, the difference in time delay ($\Delta t_d$) is 35 microseconds, well within the time differential allowed by IS-95. As such, the wireless communication system 500 depicted in FIG. 5 mitigates excess time delay in accordance with the invention.

As will be appreciated by those skilled in the art, many different alternate embodiments exist to implement excess time delay mitigation in accordance with the invention. For example, the microcells shown in any of FIGS. 2–5 could quite easily extend into the second coverage area 130. If this were the case, the microcell arrangement could be fed from both base-stations 106 and 133 to mitigate excess time delay in accordance with the invention. In fact, the invention, when broadly stated, covers any implementation where a separate station is used to transition the timing between zones of excess differential timing or a timing advance/delay means combination are used to mitigate excess time delay from a first coverage area to a second coverage area.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What we claim is:

1. A wireless communication system for communicating a source signal to a mobile station via a plurality of communication paths, the mobile station having limited capability to maintain a communication in the presence of an excess time delay of the source signal, the wireless communication system comprising:

a first base-station, located in a first coverage area and responsive to the mobile station, the first base-station utilizing a timing reference signal, a communication of the source signal from one of the plurality of the communication paths experiencing a time delay of the source signal with respect to a communication of the source signal from another of the plurality of communication paths;

a second base-station, located in a second coverage area, responsive to the mobile station and utilizing the timing reference signal; and means for adjusting the time delay of the source signal such that the time delay of the source signal is less than the excess time delay when the mobile station moves from the first coverage area to the second coverage area.

2. The wireless communication system of claim 1, wherein the means for adjusting further comprises a transition base-station, located in the first coverage area, responsive to the mobile station via a transition communication path and utilizing a time-advanced version of the timing reference signal to thus produce a time-advanced version of the source signal.

3. The wireless communication system of claim 2, wherein a coverage area serviced by the transition base-station is substantially near the second coverage area.

4. The wireless communication system of claim 1, wherein the means for adjusting further comprises a plurality of transition stations, each located in the first coverage area, each responsive to the mobile station via a corresponding plurality of transition communication paths and each utilizing a different time-advanced version of the timing reference signal to thus produce different time-advanced versions of the source signal.

5. The wireless communication system of claim 1, wherein the means for adjusting further comprises:

timing advance means for producing a time-advanced version of the timing reference signal; and delay means, in selected communication paths, for delaying the time-advanced version of the timing reference signal by corresponding selected amounts of time such that the time delay of the source signal is less than the excess time delay when the mobile station moves from the first coverage area to the second coverage area.

6. The wireless communication system of claim 5, wherein the timing advance means provides a predetermined amount of timing advance of the timing reference signal.

7. The wireless communication system of claim 5, wherein the delay means for each selected communication path provides a common amount of delay to each of the selected communication paths.

8. The wireless communication system of claim 5, wherein the delay means for each selected communication path provides a different amount of delay to each selected communication paths.

9. The wireless communication system of claim 1 wherein the first and second coverage areas further comprise either a macrocell or a microcell coverage area.

10. The wireless communication system of claim 1 wherein a communication path comprises a fiber-optic link coupled to an antenna.

11. The wireless communication system of claim 1 wherein the plurality of communication paths comprise a plurality of fiber-optic links coupled to a distributed antenna arrangement.

12. The wireless communication system of claim 1, wherein the wireless communication system comprises a code-division multiple access (CDMA) wireless communication system.

13. A method of communication handoff in a wireless communication system, the wireless communication system communicating a source signal to a mobile station, the mobile station having limited capability to maintain the communication during handoff in the presence of an excess time delay of the source signal, the method comprising the steps of:

establishing, via a first base-station in a first coverage area, a communication to the mobile station via a plurality of communication paths, the first base-station utilizing a timing reference signal such that the communication of the source signal from one of the plurality of the communication paths experiences a time delay of the source signal with respect to a communication of the source signal from another of the plurality of communication paths;

establishing, via a second base-station in a second coverage area, a communication to the mobile station and utilizing the timing reference signal; and adjusting the time delay of the source signal such that the time delay of the source signal is less than the excess time delay when the communication of the mobile station is handed off from the first coverage area to the second coverage area.

14. The method of claim 13, wherein the step of adjusting further comprises the steps of:

establishing, via a transition base-station in the first coverage area, the communication to the mobile station via a transition communication path; and utilizing a time-advanced version of the timing reference signal to thus produce a time-advanced version of the source signal.

15. The method of claim 13, wherein the step of adjusting further comprises the steps of:

establishing, via a plurality of transition stations each located in the first coverage area, a communication to the mobile station via a corresponding plurality of transition communication paths; and utilizing, in each of the plurality of transition communication paths, a different time-advanced version of the timing reference signal to thus produce different time-advanced versions of the source signal.

16. The method of claim 13, wherein the step of adjusting further comprises the steps of;

time advancing the timing reference signal to produce a time-advanced version of the timing reference signal; and delaying, in selected communication paths, the time-advanced version of the timing reference signal by corresponding selected amounts of time such that the time delay of the source signal is less than the excess time delay when the communication of the mobile station is handed off from the first coverage area to the second coverage area.

17. The method of claim 16, wherein the step of time advancing provides a predetermined amount of timing advance of the timing reference signal.

18. The method of claim 16, wherein the step of delaying, for each selected communication path, provides a common amount of delay to each of the selected communication paths.

19. The method of claim 16, wherein the step of delaying, for each selected communication path, provides a different amount of delay to each of the selected communication paths.

20. The method of claim 13, wherein the wireless communication system comprises a code-division multiple access (CDMA) wireless communication system.

21. A wireless communication system for communicating a source signal to a mobile station, the mobile station having limited capability to maintain a communication in the presence of excess time delay of the source signal, the wireless communication system comprising:

a first base-station, located in a first coverage area and responsive to the mobile station via a plurality of communication paths, the first base-station utilizing a timing reference signal such that the communication of the source signal from one of the plurality of the communication paths experiences a time delay of the source signal with respect to a communication of the source signal from another of the plurality of communication paths;

a second base-station, located in a second coverage area, for maintaining a communication to the mobile station and utilizing the timing reference signal; and a transition base-station, located in the first coverage area, for maintaining the communication to the mobile station via a transition communication path and utilizing a time-advanced version of the timing reference signal to thus produce a time-advanced version of the source signal.

22. A wireless communication system for communicating a source signal to a mobile station, the mobile station having limited capability to maintain a communication in the presence of excess time delay of the source signal, the wireless communication system comprising:

a first base-station, located in a first coverage area, for maintaining a communication to the mobile station via a plurality of communication paths, the first base-station utilizing a timing reference signal such that the communication of the source signal from one of a plurality of the communication paths experiences a time delay of the source signal with respect to a communication of the source signal from the remaining communication paths;

a second base-station, located in a second coverage area, for maintaining a communication to the mobile station and utilizing the timing reference signal; and timing advance means for producing a time-advanced version of the timing reference signal; and delay means, in selected communication paths, for delaying the time-advanced version of the timing reference signal by corresponding selected amounts of time such that the time delay of the source signal is less than the excess time delay when the mobile station moves from the first coverage area to the second coverage area.

* * * * *